US012591084B2

(12) United States Patent (10) Patent No.: US 12,591,084 B2

Lee et al. (45) Date of Patent: Mar. 31, 2026

---

(54) POLARIZING PLATE AND OPTICAL DISPLAY APPARATUS

(71) Applicant: SAMSUNG SDI CO., LTD., Yongin-si (KR)

(72) Inventors: Eun Hwa Lee, Uiwang-si (KR); Jang Hyun Cho, Uiwang-si (KR); Jin Ah Seo, Uiwang-si (KR); Hyun Ah Hong, Uiwang-si (KR); Dae Gyu Lee, Uiwang-si (KR); Seong Heun Cho, Uiwang-si (KR)

(73) Assignee: Wuxi Hengxin Optoelectronic Materials Co., Ltd., Wuxi (CN)

( * ) Notice: Subject to any disclaimer, the term of this patent is extended or adjusted under 35 U.S.C. 154(b) by 341 days.

(21) Appl. No.: 18/418,113

(22) Filed: Jan. 19, 2024

(65) Prior Publication Data

US 2024/0248244 A1 Jul. 25, 2024

(30) Foreign Application Priority Data

Jan. 20, 2023 (KR) ........................ 10-2023-0008450

(51) Int. Cl.
G02B 5/30 (2006.01)
G02B 1/11 (2015.01)
(Continued)

(52) U.S. Cl.
CPC ............... G02B 5/305 (2013.01); G02B 1/11 (2013.01); G02B 1/14 (2015.01); G02F 1/133528 (2013.01)

(58) Field of Classification Search
None
See application file for complete search history.

(56) References Cited

U.S. PATENT DOCUMENTS

| | | | |
|---|---|---|---|
| 11,307,340 B2 | 4/2022 | Wee et al. | |
| 2006/0014085 A1* | 1/2006 | Nakajima | ............ G02B 5/0242 |
| | | | 430/7 |

(Continued)

FOREIGN PATENT DOCUMENTS

| | | | |
|---|---|---|---|
| KR | 10-2018-0047569 | 5/2018 | |
| TW | 200500739 A | 1/2005 | |
| WO | WO-2008018279 A1 * | 2/2008 | ....... G02F 1/133528 |

OTHER PUBLICATIONS

Taiwanese Office Action dated Dec. 13, 2024, issued in corresponding Taiwanese Patent Application No. 113102157 (7 pages).

*Primary Examiner* — Jyotsna V Dabbi

(74) *Attorney, Agent, or Firm* — Ricky Lam

(57) ABSTRACT

A polarizing plate and an optical display apparatus including the same are provided. A polarizing plate includes a polarizer, and an optical functional layer on a light emission surface of the polarizer, and the optical functional layer includes a mixture of anisotropic particles and isotropic particles, the anisotropic particles include acicular particles, and the acicular particles are oriented in an in-plane direction of the optical functional layer, and when a light absorption axis of the polarizer is 0°, an average value of orientation angles formed between the light absorption axis of the polarizer and a longitudinal direction of the acicular particles is in a range from −10° to +10°, and a standard deviation of the orientation angles is 15° or less.

20 Claims, 4 Drawing Sheets

(51) Int. Cl.
     *G02B 1/14*        (2015.01)
     *G02F 1/1335*    (2006.01)

(56)           References Cited

U.S. PATENT DOCUMENTS

| 2006/0246232 | A1* | 11/2006 | Kubo | G02F 1/133634 |
| | | | | 428/1.31 |
| 2017/0153007 | A1* | 6/2017 | Banin | F21V 11/00 |
| 2017/0322451 | A1* | 11/2017 | Kang | C09K 11/883 |
| 2020/0348557 | A1 | 11/2020 | Kim et al. | |
| 2023/0041225 | A1* | 2/2023 | Lee | G02B 5/0278 |
| 2023/0118043 | A1* | 4/2023 | Hong | G02B 1/14 |
| | | | | 359/483.01 |
| 2023/0273477 | A1* | 8/2023 | Jung | G02F 1/133528 |
| 2024/0264351 | A1* | 8/2024 | Lee | G02B 5/3008 |

* cited by examiner

Directionality histograms

POLARIZING PLATE AND OPTICAL DISPLAY APPARATUS

CROSS-REFERENCE TO RELATED APPLICATION

The present application claims priority to and the benefit of Korean Patent Application No. 10-2023-0008450, filed on Jan. 20, 2023 in the Korean Intellectual Property Office, the entire disclosure of which is incorporated herein by reference.

BACKGROUND

1. Field

Aspects of embodiments of the present invention relate to a polarizing plate and an optical display apparatus.

2. Discussion of Related Art

Liquid crystal display devices have a structure in which a viewer-side polarizing plate, a liquid crystal panel, and a light source-side polarizing plate are sequentially stacked. A viewer-side polarizing plate is located at an outermost side of a liquid crystal display device. Therefore, a viewer views a screen through an optical member disposed on an outermost side of the viewer-side polarizing plate. An anti-glare film, a low-reflection film, an anti-reflection film, or the like is used as the optical member.

Although liquid crystal display devices have many advantages, the liquid crystal display devices have a problem of low visibility and brightness when viewed from the side. In order to solve the above problem, a method of adding a visibility improvement layer which includes two resin layers with different refractive indices and in which a pattern is formed at an interface between the resin layers to a viewer-side polarizing plate is provided. However, a visibility improvement layer having a pattern has limitations in reducing yield degradation and material costs due to a pattern forming process. Accordingly, a polarizing plate that can improve visibility even without a visibility improvement layer is desired.

The related art of the present invention is disclosed in Korean Laid-open Patent Application No. 2018-0047569.

SUMMARY

Aspects of embodiments of the present invention are directed to a polarizing plate that has a visibility improvement effect even without a pattern.

Further, aspects of embodiments of the present invention are directed to a polarizing plate of which a single layer concurrently, or simultaneously, improves visibility and controls haze.

Further, aspects of embodiments of the present invention are directed to a polarizing plate that has a thickness reduction effect.

Further, aspects of embodiments of the present invention are directed to a polarizing plate with high total light transmittance.

According to an aspect of one or more embodiments of the present invention, a polarizing plate is provided.

According to one or more embodiments, a polarizing plate includes a polarizer, and an optical functional layer on a light emission surface of the polarizer, wherein the optical functional layer includes a mixture of anisotropic particles and isotropic particles, the anisotropic particles include acicular particles, and the acicular particles are oriented in an in-plane direction of the optical functional layer, and when a light absorption axis of the polarizer is 0°, an average value of orientation angles formed between the light absorption axis of the polarizer and a longitudinal direction of the acicular particles is in a range from −10° to +10°, and a standard deviation of the orientation angles is 15° or less.

The optical functional layer may include an anti-glare layer, a hard coating layer, a low-reflection layer, an anti-reflection layer, a low refractive index layer, a high refractive index layer, or an anti-fingerprint layer.

The optical functional layer may include a contrast ratio or brightness improvement layer.

The optical functional layer may be non-adhesive.

The optical functional layer may be adhesive.

The acicular particles may be acicular micro particles.

The acicular particles may include particles formed of one or more of titanium oxide, zirconium oxide, zinc oxide, calcium carbonate, boehmite, aluminum borate, calcium silicate, magnesium sulfate, magnesium sulfate hydrate, and potassium titanate.

The acicular particles may be surface-modified.

The acicular particles may be contained in the optical functional layer in an amount of 0.1 to 10 wt %.

The isotropic particles may be randomly mixed in the optical functional layer.

The isotropic particles may include one or more types of inorganic particles, organic particles, and organic-inorganic particles.

The isotropic particles may have an average particle diameter D50 of 6 μm or less.

The isotropic particles may include one or more types of polyacrylate-based particles, polymethacrylate-based particles, polystyrene-based particles, silicone-based particles, polycarbonate-based particles, polyolefin-based particles, polyester-based particles, polyamide-based particles, polyimide-based particles, polyfluoroethylene-based particles, polymethylmethacrylate-polyacrylate-based particles, polyacrylate-polystyrene-based particles, and melamine-based particles.

The isotropic particles may be contained in a smaller amount than the acicular particles.

The isotropic particles may be contained in an amount of 1 to 80 parts by weight with respect to 100 parts by weight of the acicular particles.

The isotropic particles may be contained in the optical functional layer in an amount of 0.05 wt % to 2 wt %.

The optical functional layer may include a matrix into which the anisotropic particles and the isotropic particles are impregnated.

The acicular particles and the isotropic particles may each have a higher refractive index than the matrix.

The optical functional layer may have overall planar upper and lower surfaces.

The polarizing plate may further include one or more of a protective layer, an adhesive layer, a bonding layer, a functional film, and a functional coating layer.

A laminate of the optical functional layer and the protective layer may have an internal haze of 10% to 60%.

According to an aspect of one or more embodiments of the present invention, an optical display apparatus is provided.

The optical display apparatus includes the polarizing plate according to an embodiment of the present invention.

According to an aspect of embodiments of the present invention, a polarizing plate that has a visibility improvement effect even without a pattern is provided.

According to another aspect of embodiments of the present invention, a polarizing plate of which a single layer concurrently, or simultaneously, improves visibility and controls haze is provided.

According to another aspect of embodiments of the present invention, a polarizing plate that has a thickness reduction effect is provided.

According to another aspect of embodiments of the present invention, a polarizing plate with high total light transmittance is provided.

BRIEF DESCRIPTION OF THE DRAWINGS

The above and other objects, features and advantages of the present invention will become more apparent to those of ordinary skill in the art by describing some example embodiments thereof in further detail with reference to the accompanying drawings, in which.

DETAILED DESCRIPTION

Figure 1:
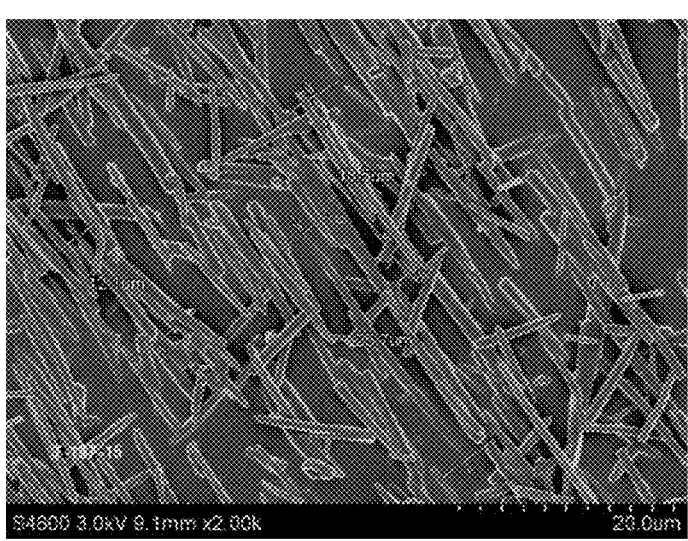
FIG. 1 is a scanning electron microscope (SEM) picture of a plurality of acicular particles used in the present invention.

Some example embodiments of the present invention that can be performed by those skilled in the art will be described in further detail with reference to the accompanying drawings. However, the present invention may be implemented in various different forms and is not limited to the embodiments described herein.

Terminology used herein is for the purpose of describing particular embodiments and is not intended to be limiting of the present invention. As used herein, the singular forms "a" and "an" are intended to also include the plural forms, unless the context clearly indicates otherwise.

In the drawings, parts not related to the description may be omitted to clearly describe the present invention, and the same reference numerals are used for the same or similar elements throughout the specification.

In the specification, the terms "upper" and "lower" are defined based on the drawings; however, "upper" may be changed to "lower" or "lower" may be changed to "upper" according to the perspective, and when a first component is referred to being disposed "on" a second component, the first element may be directly disposed on the second component or one or more other components may be interposed between the first and second components. On the other hand, when a first component is referred to as being disposed "directly on," being "directly formed on," or being "directly formed in contact with" a second component, this means that there is no intervening component.

In the specification, "in-plane retardation Re" is a value at a wavelength of 550 nm, and is expressed by the following Equation A:

$$Re = (nx - ny) \times d,$$  Equation A where, in Equation A, nx and ny denote the refractive indices of a protective layer in a slow axis direction and a fast axis direction, respectively, at a wavelength of 550 nm, and d denotes a thickness (units: nm) of the protective layer.

In the specification, (meth)acrylic is acrylic and/or methacrylic.

In the specification, the term "refractive index" may be a value measured at a wavelength of 380 nm to 780 nm, for example, 550 nm.

In the specification, the term "total light transmittance" may be a value measured at a wavelength of 380 nm to 780 nm, for example, 550 nm.

The refractive index and the total light transmittance may be measured by conventional methods known to those skilled in the art.

In the specification, in describing a numerical range, "X to Y" means "X≤ and ≤Y."

A polarizing plate according to embodiments of the present invention has a visibility improvement effect even without a pattern. Further, the polarizing plate according to embodiments of the present invention has an effect of improving visibility and controlling haze concurrently, or simultaneously, with a single layer. Further, the polarizing plate according to embodiments of the present invention has a thickness reduction effect. Further, the polarizing plate according to embodiments of the present invention has high total light transmittance.

The polarizing plate according to one or more embodiments of the present invention includes a polarizer, and an optical functional layer laminated on a light emission surface of the polarizer, wherein the optical functional layer includes a mixture of isotropic particles and anisotropic particles, the anisotropic particles include acicular particles, and the acicular particles are oriented in an in-plane direction of the optical functional layer, and when it is assumed that a light absorption axis of the polarizer is 0°, an average value of orientation angles formed between the light absorption axis of the polarizer and a longitudinal direction of the acicular particles is in a range from −10° to +10°, and a standard deviation of the orientation angles is 15° or less.

Herein, a polarizing plate according to an embodiment of the present invention will be described.

The polarizing plate includes a polarizer and an optical functional layer.

Optical Functional Layer

The optical functional layer is laminated on a light emission surface of the polarizer. The light emission surface is a surface where the internal light of a backlight unit reaches a polarizer and from which the internal light is emitted.

The optical functional layer includes a mixture of anisotropic particles and isotropic particles. The isotropic particles are particles of which optical properties are the same in all directions of the particles. The anisotropic particles are particles of which optical properties are different according to directions of the particles.

In an embodiment, the mixture of the anisotropic particles and the isotropic particles may be contained in the optical functional layer in an amount of 1 wt % to 20 wt %, for example, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, or 20 wt %, and, in an embodiment, 1 wt % to 15 wt %, and, in an embodiment, 3 wt % to 10 wt %, or 5 wt % to 10 wt %. Within the above range, the effects of the present invention described above can be easily achieved.

The anisotropic particles include acicular particles. In the present invention, among various types of anisotropic particles, acicular particles are contained and used to improve visibility and a contrast ratio using a difference in the degree of light diffusion according to refractive indexes and orientation of the particles.

The acicular particles are oriented in an in-plane direction of the optical functional layer, and when it is assumed that a light absorption axis of the polarizer is 0°, an average value of orientation angles formed between the light absorption axis of the polarizer and a longitudinal direction of the acicular particles is in a range from −10° to +10°, and a standard deviation of the orientation angles is 15° or less. Within the above ranges of the average value and the standard deviation, a contrast ratio and/or brightness at each of a front surface and a side surface of the polarizing plate can be improved, and a relative luminance ratio of the side surface to the front surface may be increased. By increasing the relative luminance ratio of the side surface to the front surface, screen quality between the front surface and the side surface may be made uniform. Accordingly, the optical functional layer may function as a light diffusion layer and as a contrast ratio and/or brightness improvement layer. When any one of the average value and standard deviation of the orientation angles is not satisfied, the effects of the present invention may not be properly achieved. For example, the average value of the orientation angles may be −10°, −9°, −8°, −7°, −6°, −5°, −4°, −3°, −2, −1°, 0°, +1°, +2°, +3°, +4°, +5°, +6°, +7°, +8°, +9°, or +10°, and the standard deviation of the orientation angles may be 0°, 1°, 2°, 3°, 4°, 5°, 6°, 7°, 8°, 9°, 10°, 11°, 12°, 13°, 14°, or 15°.

As will be described below, the optical functional layer has overall planar upper and lower surfaces that are not patterned. However, irregularities may be formed on the upper surface, and, in this case, a range of surface roughness may be 1 μm or less, for example, 0 μm to 1 μm, 0.01 μm to 1 μm, or 0.05 μm to 0.6 μm. Nevertheless, the optical functional layer contains the acicular particles, the average value and standard deviation of the orientation angles of the present invention may be satisfied, and, thus, the contrast ratio and/or brightness can be improved at the front surface and the side surface. As such, there is no need to include an optical pattern or a pattern layer, and, thus, a manufacturing process of the polarizing plate can be improved and a thickness reduction effect can be achieved.

The acicular particles will be described in further detail.

Figure 2:
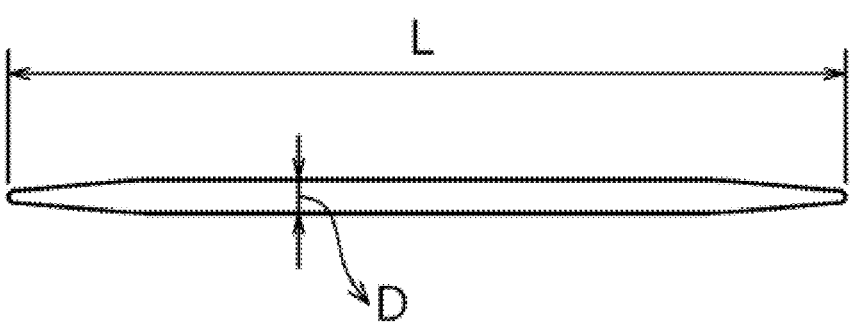
FIG. 2 is a schematic cross-sectional view of an acicular particle.

FIG. 1 is a scanning electron microscope (SEM) picture of acicular particles used in the present invention. FIG. 2 is a schematic cross-sectional view of an acicular particle.

The acicular particle may be a needle-shaped particle and has a length L and a diameter (e.g., a predetermined diameter) D, and may be a particle in which the diameter D is not uniform throughout the length L but decreases toward both ends of the acicular particle. Since acicular particles with a non-homogeneous thickness exhibit optical anisotropy, the acicular particles may allow light incident from a polarizer to be emitted in different directions when the incident light passes through the acicular particle.

FIG. 2 illustrates a case in which the diameter of the acicular particle decreases toward both ends. However, depending on a manufacturing process of the acicular particles, the diameter may be uniform toward one end, but may decrease toward another end.

In an embodiment, the acicular particles may be acicular micro particles of which the length L is a value in micrometer units. Here, the value in micrometer units means that the length L is at least 1 μm. This means that, in embodiments of the present invention, the acicular micro particles are easily oriented, thus helping to improve the contrast ratio and brightness. Particles (e.g., nanorods or acicular nanoparticles) of which the length L is a value in nanometer units may not be easily oriented in the present invention, and thus it may not be easy to achieve the effects of the present invention, and when an excessive amount of particles are contained to provide the same effect, optical properties may be poor.

In an embodiment, the length L may be in a range from 10 μm to 30 μm, and, in an embodiment, 15 μm to 28 μm. Within the above range, the acicular particles in the present invention may be easily oriented, thus improving the contrast ratio and brightness.

In an embodiment, the diameter D may be in a range from 0.5 μm to 2 μm, and, in an embodiment, 0.5 μm to 1 μm. Within the above range, an aspect ratio may be increased to have a lateral diffusion effect. The diameter is a cross-sectional diameter of the acicular particle, and may be a diameter having a maximum value among diameters measured in a cross-section of the acicular particle. The cross-section of the acicular particle may have a spherical shape, an oval shape, or an amorphous shape, but the present invention is not limited thereto.

The acicular particle may have an average aspect ratio of 5 or more, for example, 5 to 60. Within the above range, the effect of improving the contrast ratio and brightness of the present invention can be easily achieved. In an embodiment, the average aspect ratio may be in a range from 10 to 50, and, in an embodiment, 15 to 25. The average aspect ratio means an average value of aspect ratios measured for each acicular particle, and the aspect ratio means a ratio of the length to the maximum cross-sectional diameter of the acicular particle.

The acicular particles are oriented in an in-plane direction of an optical functional layer, wherein an average value of orientation angles is in a range from −10° to +10°, and a standard deviation of the orientation angles is 15° or less. When it is assumed that a light absorption axis of the polarizer is 0°, the orientation angle is an angle formed between the light absorption axis of the polarizer and a longitudinal direction of the acicular particle. Spherical particles, particularly, isotropic particles, have a spherical shape, but the spherical particles do not have a longitudinal direction, and thus there may be no orientation angle.

By ensuring that the average value of the orientation angles is in a range from −10° to +10° and the standard deviation of the orientation angles is 15° or less, the contrast ratio and brightness at a front surface and a side surface can be improved by allowing the light incident from the polarizer to be emitted in different directions when the incident light passes through the acicular particle. The light absorption axis of the polarizer may be a machine direction (MD) of the polarizer.

The average value and standard deviation of the orientation angles will be described with reference to FIGS. 3 and 4.

Figure 3:
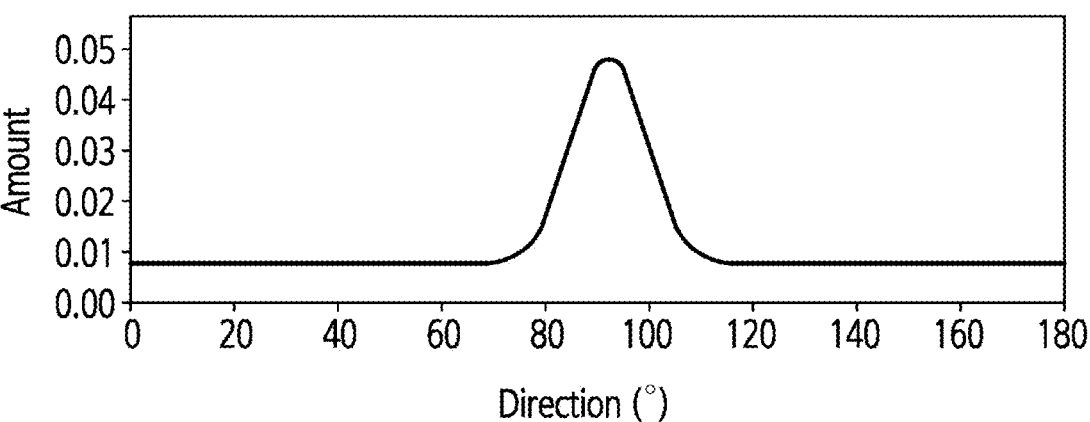
FIG. 3 is a schematic diagram showing a distribution of angles formed by a longitudinal direction of acicular particles with respect to a reference, assuming that a light absorption axis of a polarizer is 90° with respect to the reference.
Figure 4A:
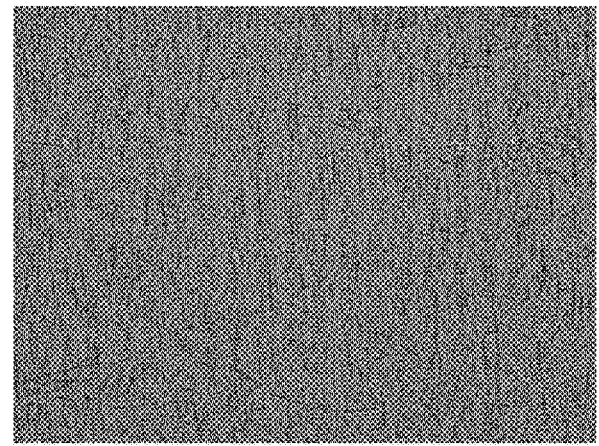
FIG. 4A is an enlarged picture of the orientation of acicular particles in an optical functional layer according to an embodiment of the present invention.
Figure 4B:
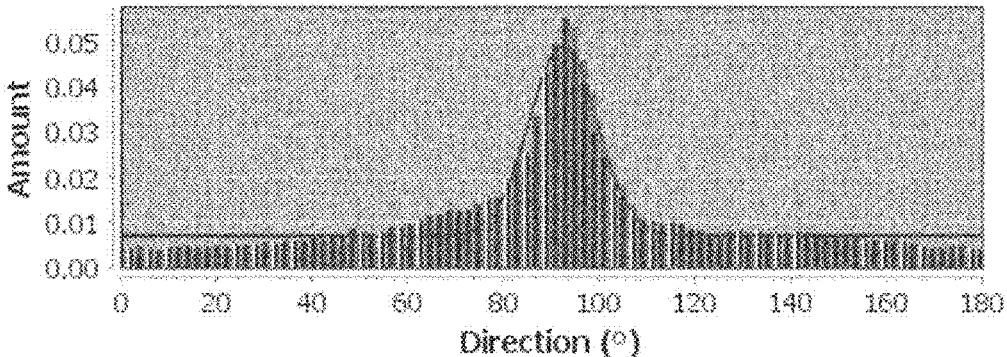
FIG. 4B is a result showing a distribution of actually measured orientation angles for the optical functional layer of the embodiment of the present invention.

FIG. 3 is a schematic diagram showing a distribution of angles formed by a longitudinal direction of acicular particles with respect to a reference, assuming that a light absorption axis of a polarizer is 90° with respect to the reference; FIG. 4A is an enlarged picture of the orientation of acicular particles in an optical functional layer according to an embodiment of the present invention; and FIG. 4B is a result showing a distribution of actually measured orientation angles for the optical functional layer of the embodiment of the present invention.

An average value obtained by averaging the above angles −90° is the average value of the orientation angles of the present invention. For example, when the average value obtained by averaging the above angles −90° is 80°, the average value of the orientation angles is −10°, and when the average value obtained by averaging the above angles −90° is 100°, the average value of the orientation angles is +10°. The standard deviation may be obtained by being calculated through the distribution using a conventional method.

The average value and standard deviation of the orientation angles may be measured with reference to methods described in the experimental examples below.

In an embodiment, the average value of the orientation angles may be in a range from −4.0° to +4.0°, and, in an embodiment, −2.5° to +2.5°, and the standard deviation of the orientation angles may be in a range from 0° to 15°, and, in an embodiment, 0° to 13°. Within the above ranges, the effects of the present invention can be further improved.

In an embodiment, at least 90%, for example, 95% to 100%, of the acicular particles are oriented and aligned to have the orientation angle of ~10° to +10°. Within the above range, an effect of a uniform contrast ratio and improved visibility can be achieved. Here, "%" means a ratio of the number of acicular particles with an orientation angle of −10° to +10° to the total number of acicular particles contained in the optical functional layer.

The acicular particles may have a higher refractive index than a matrix to be described below. Because of this, the effects of the present invention can be easily achieved. In an embodiment, the refractive index of the acicular particles—the refractive index of the matrix may be 0.5 or less, for example, greater than 0 and less than or equal to 0.3. Within the above range, the effects of the present invention can be easily achieved.

The acicular particles may have a refractive index of 1.5 to 2.2, and, in an embodiment, 1.6 to 1.8, and, in an embodiment, 1.65 to 1.7. Within the above range, the acicular particles may have an appropriate refractive index compared to a resin layer (or matrix) to be described below, and thus can help improve the contrast ratio and visibility.

The acicular particles may be particles formed of one or more of metal oxides such as titanium oxide (e.g., $TiO_2$), zirconium oxide (e.g., $ZrO_2$), zinc oxide (e.g., $ZnO$), and the like, metal compounds such as calcium carbonate ($CaCO_3$), boehmite, aluminum borate (e.g., $AlBO_3$), calcium silicate (e.g., $CaSiO_3$, wollastonite), magnesium sulfate ($MgSO_4$), magnesium sulfate hydrate (e.g., $MgSO_4 \cdot 7H_2O$), potassium titanate (e.g., $K_2Ti_8O_{17}$), and the like, inorganic particles such as glass and the like, organic particles such as synthetic resin and the like, and organic-inorganic particles. In an embodiment, inorganic acicular particles formed of calcium carbonate may allow the effects of the present invention to be easily achieved and can be easily manufactured.

In an embodiment, the acicular particles may be contained in the matrix without surface modification. However, surface-modified acicular particles can improve the optical properties of the optical functional layer by further increasing the compatibility with the matrix of organic materials and the dispersibility of the particles, as will be described below, and can prevent or substantially prevent agglomeration of the particles, and, thus, the effects of the present invention can be easily achieved. In an embodiment, 50% or more, for example, 60% to 100%, or 60% to 95%, of a total surface area of the acicular particle may be surface-modified. Within the above range, the effect of improving compatibility and dispersibility can be obtained.

In an embodiment, the surface of the acicular particle may be modified with one or more of silane-based compounds, surfactants, and oils. In an embodiment, the acicular particles are surface-treated with a silane-based compound having a (meth)acryloyloxy group or a (meth)acrylate group, and, thus, a resin layer formed of an active energy ray-curable composition to be described below may have excellent compatibility and dispersibility with the matrix.

The silane-based compound having a (meth)acryloyloxy group or a (meth)acrylate group may include one or more of 3-(meth)acryloyloxypropyl methyldimethoxysilane, 3-(meth)acryloyloxypropyltrimethoxysilane, 3-(meth)acryloyloxypropylmethyldiethoxysilane, and 3-(meth)acryloyloxypropyl triethoxysilane, and, in an embodiment, one or more of 3-(meth)acryloyloxypropyltrimethoxysilane and 3-(meth)acryloyloxypropyltriethoxysilane.

In an embodiment, the acicular particles may be contained in an amount of 90% or more, for example, 95% to 100%, or 100%, of the anisotropic particles contained in the optical functional layer. Within the above range, the effects of the present invention can be easily achieved. Here "%" means a ratio of a weight of the acicular particles to a weight of the anisotropic particles contained in the optical functional layer.

The anisotropic particles, and, in an embodiment, the acicular particles, may be contained in the optical functional layer in an amount of 0.1 wt % to 10 wt %, for example, 0.1 wt %, 1 wt %, 2 wt %, 3 wt %, 4 wt %, 5 wt %, 6 wt %, 7 wt %, 8 wt %, 9 wt %, or 10 wt %, and, in an embodiment, 2 wt % to 8 wt %, and, in an embodiment, 4 wt % to 6 wt %. Within the above range, a side visibility effect can be achieved while maintaining frontal brightness.

In the polarizing plate of the present invention, anisotropic particles, and, in an embodiment, acicular particles, are additionally included in the optical functional layer containing isotropic particles, but the orientation angle and orientation deviation are adjusted such that, although the polarizing plate does not have a pattern, an effect of improving visibility and an effect of reducing the thickness of the polarizing plate can be achieved. That is, in the polarizing plate of the present invention, acicular particles are added to the optical functional layer containing isotropic particles, and, thus, an effect of improving a contrast ratio and/or visibility and a thickness reduction effect can be achieved without the need to include a conventional pattern layer for improving visibility. Further, when the optical functional layer containing isotropic particles is capable of controlling haze, improvement in visibility and control of haze can be achieved concurrently, or simultaneously, with a single layer.

In an embodiment, the optical functional layer containing isotropic particles may be an anti-glare layer, a hard coating layer, a low-reflection layer, an anti-reflection layer, a low refractive index layer, a high refractive index layer, or an anti-fingerprint layer.

The isotropic particles may be appropriately selected and used according to the function of the optical functional layer. However, the isotropic particles should be selected to not affect the orientation of the acicular particles.

In an embodiment, the optical functional layer may be an anti-glare layer. In this case, the optical functional layer may be an anti-glare layer that improves a contrast ratio and/or visibility. The anti-glare layer is a single layer, and can improve a contrast ratio and/or visibility and also control haze (e.g., internal haze) by adjusting the type, average particle diameter, and/or content of isotropic particles.

In an embodiment, the optical functional layer may have an internal haze of 10% to 60%, for example, 10%, 15%, 20%, 25%, 30%, 35%, 40%, 45%, 50%, 55%, or 60%, for example, 30% to 50%. Within the above range, an anti-glare effect can be achieved to improve glare and/or sparkling.

In one embodiment, a laminate of the optical functional layer and a protective layer to be described below may have an internal haze of 10% to 60%, for example, 10%, 15%, 20%, 25%, 30%, 35%, 40%, 45%, 50%, 55%, or 60%, for example, 20% to 50% or 20% to 40%. Within the above range, an anti-glare effect can be achieved to improve (or decrease) glare and/or sparkling.

In an embodiment, the laminate of the optical functional layer and the protective layer to be described below may have a total light transmittance of 95% or more, for example, 97% or more.

The isotropic particles may include one or more types of inorganic particles, organic particles, and organic-inorganic particles commonly used in anti-glare layers. In an embodiment, organic particles may be used.

The isotropic particles are microparticles, nanoparticles, or the like with an average particle diameter D50 in micrometers, nanometers, or the like, the shape thereof is not particularly limited to a shape such as a spherical shape, an amorphous shape, or the like, and the average particle diameter D50 may be 6 μm or less. Within the above range, an anti-glare effect can be easily achieved. In an embodiment, to easily achieve an anti-glare effect and an effect of improving visibility when mixed with the acicular particles of the present invention, the average particle diameter D50 may be, for example, 0.01 μm, 1 μm, 2 μm, 3 μm, 4 μm, 5 μm, 6 μm, and, in an embodiment, 0.01 μm to 6 μm, or 0.5 μm to 5.5 μm, and, in an embodiment, 1 μm to 5 μm. The isotropic particles may contain a mixture of two or more types of particles having different average particle diameters D50.

In this specification, average particle diameter D50 is the typical average particle diameter D50 known to those skilled in the art, and is a particle diameter of particles corresponding to 50% by volume when the particles are distributed in order from minimum to maximum based on the volume.

The isotropic particles may have an appropriate difference in refractive index compared to the matrix to be described below. For example, the isotropic particles may have a higher or lower refractive index than the matrix, and, in an embodiment, may have a higher refractive index than the matrix, and, in this case, an anti-glare effect can be easily achieved. In an embodiment, a difference between the refractive index of the isotropic particle and the refractive index of the matrix may be 0.2 or less, for example, 0.01 to 0.2. Within the above range, the effects of the present invention can be easily achieved.

In an embodiment, the refractive index of the isotropic particle may be in a range from 1.4 to 1.65, and, in an embodiment, 1.45 to 1.60. Within the above range, an anti-glare effect can be achieved.

The organic particles may be appropriately selected and used from among organic particles having the above-described refractive index.

The organic particles may include core-shell type particles, or, in an embodiment, non-core-shell type particles, that is, particles made entirely of a single material, rather than the core-shell type particles. A single material constituting the organic particles may include any of polyacrylate-based particles, polymethacrylate-based particles containing polymethyl methacrylate (PMMA) or the like, polystyrene (PS)-based particles, silicone-based particles, polycarbonate-based particles, polyolefin-based particles, polyester-based particles, polyamide-based particles, polyimide-based particles, polyfluoroethylene-based particles, PMMA-polyacrylate-based particles, polyacrylate-PS-based particles, melamine-based particles, and the like. In an embodiment, the organic particles may be a mixture of PS-based particles and polyacrylate-based particles or polymethacrylate-based particles.

In an embodiment, the optical functional layer may be a hard coating layer.

The isotropic particles may be contained in the optical functional layer in a smaller amount than the anisotropic particles, and, in an embodiment, the acicular particles. When the isotropic particles are contained a larger amount than the acicular particles, an effect of improving a contrast ratio and/or visibility resulting from the acicular particles may be lowered. In an embodiment, the isotropic particles may be contained in an amount of 0.5 parts by weight to 80 parts by weight, for example, 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 parts by weight, and, in an embodiment, 1 part by weight to 10 parts by weight, with respect to 100 parts by weight of the anisotropic particles, and, in an embodiment, the acicular particles. Within the above range, an internal haze control effect can be achieved.

In an embodiment, the isotropic particles may be contained in the optical functional layer in an amount of 0.05 wt % to 2 wt %, for example, 0.05 wt %, 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, or 2.0 wt %, and, in an embodiment, 0.1 wt % to 1 wt %, and, in an embodiment, 0.2 wt % to 0.8 wt %, or 0.2 wt % to 0.6 wt %. Within the above range, an internal haze control effect can be achieved.

Figure 5:
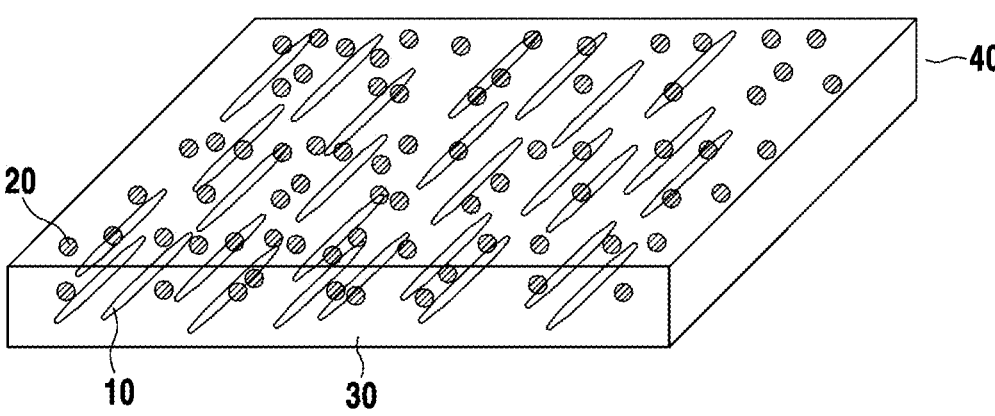
FIG. 5 is a perspective view of an optical functional layer according to an embodiment of the present invention.

FIG. 5 is a perspective view of an optical functional layer according to an embodiment of the present invention. Referring to FIG. 5, an optical functional layer 40 includes acicular particles 10 and isotropic particles 20.

While the acicular particles 10 may be oriented in one direction, the isotropic particles 20 may be randomly mixed in the optical functional layer 40.

The isotropic particles 20 may be positioned between the acicular particles 10, and may be contained in a state of being in contact or non-contact with the acicular particles 10.

The optical functional layer 40 may include the acicular particles 10 and the isotropic particles 20 (e.g., only the acicular particles 10 and the isotropic particles 20), and the acicular particles 10 and the isotropic particles 20 may be impregnated into a matrix 30 for a bonding relationship between the polarizer and the protective layer of the polarizing plate, mechanical strength of the polarizing plate, etc. The matrix 30 is a remaining portion of the optical functional layer excluding the acicular particles 10 and the isotropic particles 20.

The matrix 30 may include a cured product formed of a composition containing one or more of a heat-curable resin and an active energy ray-curable resin.

The heat-curable resin is a resin that is cured by drying and/or thermal processing, and may include, for example, a resin having a thermosetting reactive group such as a (meth)acrylate group, an epoxy group, a urethane group, a urethane (meth)acrylate group, or the like. For example, the heat-curable resin may be a (meth)acrylic-based resin or the like.

The active energy ray-curable resin is a resin that is cured by ultraviolet (UV) rays, and may include, for example, a resin having a photocurable reactive group. For example, the photocurable reactive group may be a vinyl group, a (meth) acrylate group, etc., and the active energy ray-curable resin may have one or more of the photocurable reactive groups. For example, the active energy ray-curable resin may be used by selecting a resin that can achieve the effects of the present invention from among resins such as a (meth) acrylate-based resin, a urethane (meth)acrylate-based resin, an epoxy (meth)acrylate-based resin, a silicone (meth)acrylate-based resin, and the like.

The composition may further include an initiator that cures one or more of a heat-curable resin and an active energy ray-curable resin. For example, the initiator may be one or more of a thermal initiator and a photoinitiator. The thermal initiator may be an azo-based initiator, a peroxide-based initiator, or the like. The photoinitiator may be a phosphorus-based photo radical initiator, a phosphine oxide-based photo radical initiator, a ketone-based photo radical initiator, a cyclohexyl ketone-based photo radical initiator, or the like.

The composition may include one or more of a heat curable crosslinking agent and a photocuring crosslinking agent. The heat curable crosslinking agent may be an isocyanate-based crosslinking agent, an epoxy-based crosslinking agent, an amine-based crosslinking agent, or the like. The photocuring crosslinking agent may be a multifunctional photocurable monomer having two or more photocurable reactive groups.

The composition may include conventional additives known to those skilled in the art, such as a leveling agent, a surface control agent, an antistatic agent, a dispersant, a dye, a pigment, etc.

In an embodiment, the matrix may have a refractive index of 1.4 to 1.60, and, in an embodiment, 1.45 to 1.55. Within the above range, the internal haze and the like can be easily controlled.

The optical functional layer may be non-adhesive or adhesive, depending on the composition that forms the matrix.

The optical functional layer may be manufactured by a method to be described below. The optical functional layer may be formed by coating an adherend with a composition for an optical functional layer and then curing the composition. The coating may be performed by conventional methods known to those skilled in the art, for example, slot die coating, micro gravure coating, a gap roller method, bar coating, etc.

The orientation angle and standard deviation of the present invention may be adjusted by adjusting the viscosity of the composition when forming the composition for an optical functional layer (e.g., adjusting to 100 to 400 cPs at 25° C.), or adjusting a coating pressure (e.g., 0.1 to 0.4 mPa at 25° C.) when coating with the composition for an optical functional layer, but the present invention is not limited thereto. The viscosity may be adjusted by adjusting the type and/or content of a solvent, but the present invention is not limited thereto.

In an embodiment, the optical functional layer may have a thickness of 40 μm or less, for example, 3 μm to 35 μm, or 5 μm to 30 μm. Within the above range, the optical functional layer may be used in the polarizing plate.
Polarizing Plate A polarizing plate may further include one or more of polarizers, protective layers (including retardation layers), adhesive layers and/or bonding layers, functional films (including functional coating layers), and the like, in addition to an optical functional layer.
(i) Polarizer The polarizer is a linear light absorbing polarizer, and may provide a polarization function by transmitting only light in one direction among incident light and absorbing light in a direction perpendicular to one direction.

The polarizer may be a polarizer manufactured by dyeing and stretching a polyvinyl alcohol (PVA)-based film, or may be a polyene-based polarizer manufactured by dehydrating a PVA-based film.

In an embodiment, the polarizer may have a thickness of 50 μm or less, for example, 5 μm to 30 μm. Within the above range, there may be no melting or breakage of the film when stretching the film.
(ii) Protective Layer A protective layer may be included in the polarizing plate to protect the polarizer or increase the mechanical strength of the polarizing plate. The protective layer may be an adherend that forms the optical functional layer.

The protective layer may include a transparent substrate. The transparent substrate may have a higher or lower refractive index than the optical functional layer. In an embodiment, the transparent substrate may have a higher refractive index than the optical functional layer. Accordingly, a contrast ratio and brightness can be improved.

The transparent substrate may include an optically transparent resin film including a light incident surface and a light emitting surface opposite to the light incident surface. The transparent substrate may be made of a single layer of resin film, or a plurality of laminated resin films. The resin may include one or more of cellulose ester-based resins including triacetylcellulose (TAC) or the like, cyclic polyolefin (COP)-based resins including amorphous COP or the like, polycarbonate resins, polyester-based resins including polyethylene terephthalate (PET) or the like, polyacrylate-based resins including polyethersulfone-based resins, polysulfone-based resins, polyamide-based resins, polyimide-based resins, acyclic-polyolefin-based resins, PMMA resins, etc., PVA-based resins, polyvinyl chloride-based resins, and polyvinylidene chloride-based resins, but the present invention is not limited thereto. In an embodiment, the transparent substrate includes a polyester-based resin including PET or the like, and, thus, an effect of improving a contrast ratio and brightness can be further increased.

In an embodiment, the transparent substrate may have a haze of 30% or less, and, in an embodiment, 2% to 30%, and a light transmittance of 90% or more, and, in an embodiment, 95% to 100%. Within the above range, the transparent substrate may be applied to the polarizing plate.

A thickness of the transparent substrate may be in a range from 5 μm to 200 μm, for example, 30 μm to 120 μm. Within the above range, the transparent substrate may be used in the polarizing plate.

In an embodiment, the protective layer may be composed of a transparent substrate alone. In another embodiment, the protective layer may further include a transparent substrate and a functional layer laminated on at least one surface of the transparent substrate. The functional layer may be a low-reflection layer, a primer layer, an anti-glare layer, an anti-reflection layer, a low refractive index layer, a high refractive index layer, a hard coating layer, an anti-finger-print layer, or the like.

The protective layer is an isotropic film and may have substantially no retardation, but may have a retardation in an in-plane direction within a certain range (e.g., a predeter-mined range) to provide an additional function when com-bined with the polarizing plate.

In an embodiment, the protective layer may have an in-plane retardation of 3,000 nm or more at a wavelength of 550 nm. Within the above range, a contrast ratio and/or brightness can be improved when combined with the optical functional layer. In an embodiment, the in-plane retardation may be 4,000 nm or more, 8,000 nm or more, and, in an embodiment, 10,000 nm or more, and, in an embodiment, more than 10,000 nm, and, in an embodiment, 10,100 nm to 30,000 nm, or 10,100 nm to 15,000 nm.

In an embodiment, the protective layer may have an in-plane retardation of less than 3,000 nm at a wavelength of 550 nm. For example, the protective layer may have an in-plane retardation of 0 nm to 1,000 nm or 10 nm to 500 nm at a wavelength of 550 nm.

The protective layer may be a first protective layer, a second protective layer, a third protective layer, or the like, which will be described below.

(iii) Adhesive Layer and/or Bonding Layer

An adhesive layer and/or a bonding layer may adhere or bond a polarizer, an optical functional layer, a protective layer, a functional film, or the like.

The adhesive layer may be an adhesive layer formed of a common composition known to those skilled in the art. For example, the adhesive layer may be a (meth)acrylic-based adhesive layer, an epoxy-based adhesive layer, a silicone-based adhesive layer, a urethane-based adhesive layer, an epoxy (meth)acrylic-based adhesive layer, or a urethane (meth)acrylic-based adhesive layer. For example, the adhe-sive layer may be a pressure sensitive adhesive (PSA) layer.

The bonding layer may be a bonding layer formed of a common composition known to those skilled in the art. For example, the bonding layer may be formed of a water-based adhesive, a photocurable adhesive, etc.

(iv) Functional Film

A functional film does not necessarily need to be included in a polarizing plate, but may be a film that provides an additional function when included in the polarizing plate.

The functional film (or a functional coating layer) may be an anti-glare film, an anti-reflection film, a low-reflection film, an ultra-low-reflection film, a low refractive index film, a high refractive index film, a hard coating film, or an anti-fingerprint film.

FIGS. 6 to 9 are cross-sectional views of polarizing plates according to embodiments of the present invention.

Figure 6:
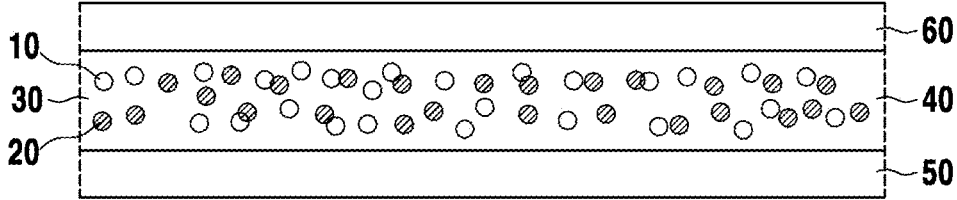
FIGS. 6 to 9 are cross-sectional views of polarizing plates according to embodiments of the present invention.

Referring to FIG. 6, a polarizing plate may include a polarizer 50, and an optical functional layer 40 and a first protective layer 60 which are sequentially laminated on a light emission surface of the polarizer 50.

Figure 7:
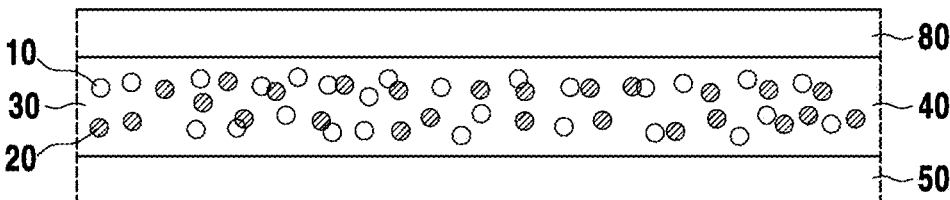

Referring to FIG. 7, a polarizing plate may include a polarizer 50, and an optical functional layer 40 and a functional coating layer 80 which are sequentially laminated on a light emission surface of the polarizer 50.

Figure 8:
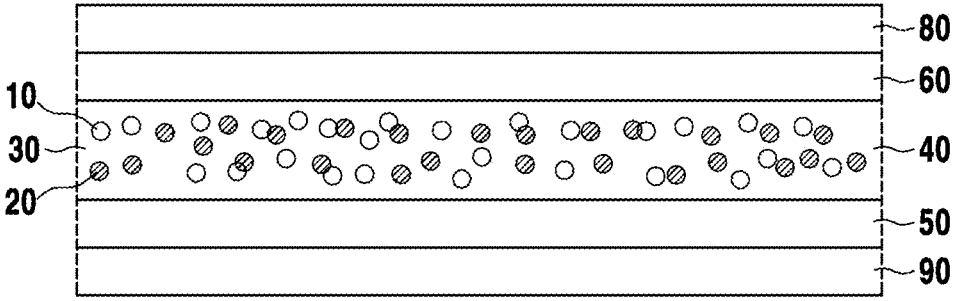

Referring to FIG. 8, a polarizing plate may include a polarizer 50, an optical functional layer 40, a first protective layer 60, and a functional coating layer 80 which are sequentially laminated on a light emission surface of the polarizer 50, and a third protective layer 90 which is laminated on a light incident surface of the polarizer 50.

Figure 9:
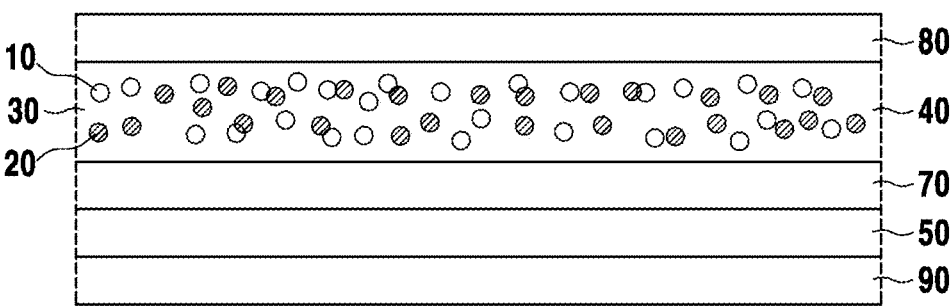

Referring to FIG. 9, a polarizing plate may include a polarizer 50, a second protective layer 70, an optical func-tional layer 40, and a functional coating layer 80 which are sequentially laminated on a light emission surface of the polarizer 50, and a third protective layer 90 which is laminated on a light incident surface of the polarizer 50.

Each layer of the polarizing plate may be laminated by an adhesive layer or a bonding layer.

An optical display apparatus of the present invention includes the polarizing plate according to an embodiment of the present invention.

In an embodiment, an optical display apparatus of the present invention may include the polarizing plate according to an embodiment of the present invention as a viewer-side polarizing plate in a liquid crystal panel. The viewer-side polarizing plate is a polarizing plate disposed opposite to a screen side, that is, a light source side, of the liquid crystal panel.

In an embodiment, a liquid crystal display device may include a light-collecting backlight unit, a light source-side polarizing plate, a liquid crystal panel, and a viewer-side polarizing plate that are sequentially stacked, and the viewer-side polarizing plate may include the polarizing plate according to an embodiment of the present invention. The light source-side polarizing plate is a polarizing plate dis-posed on a light source side. The liquid crystal panel may adopt a vertical alignment (VA) mode, an in-plain switching (IPS) mode, a patterned vertical alignment (PVA) mode, or a super-patterned vertical alignment (S-PVA) mode, but the present invention is not limited thereto.

The optical display apparatus may be a foldable or flexible optical display apparatus or a non-foldable or non-flexible optical display apparatus.

Herein, a configuration and operation of the present invention will be described in further detail through some example embodiments of the present invention. However, the following examples are intended to aid understanding of the present invention, and the scope of the present invention is not limited to the following examples.

Example 1

(1) A mixture of CaCO$_3$ particles (CaCO$_3$ particles: acicu-lar anisotropic micro particles, length: 10 μm to 30 μm, cross-sectional diameter: 0.5 μm to 2.0 μm, Whimscal A, MARUO CALCIUM Co., Ltd., refractive index: 1.68) was added to a methyl ethyl ketone solution, which is a solvent, containing KBM503 (3-methacryloxypropyl trimethoxysi-lane), which were reacted at room temperature and then dried in an oven at 90° C. to remove the solvent so as to prepare a CaCO$_3$ particle mixture surface-modified with 3-methacryloxypropyl trimethoxysilane.

A composition (4550P, Shina TNC Co., Ltd.) containing a resin was added to the CaCO$_3$ particle mixture, which were mixed for four hours using a stirrer, and PMMA particles (MX-300, Soken Co., Ltd., spherical isotropic particles, average particle diameter D50: 3 μm, refractive index: 1.49) were added thereto and mixed with methyl ethyl ketone, which is a solvent, to prepare a composition for an optical functional layer. Based on solid content, the composition for an optical functional layer contained 6 wt % $CaCO_3$ acicular anisotropic micro particles and 0.6 wt % PMMA isotropic particles. In this case, the viscosity of the composition for an optical functional layer was adjusted using the content of the methyl ethyl ketone, which is a solvent.

(2) A PVA-based film was stretched 3-fold uniaxially in an MD at 60° C., adsorbed iodine, and then stretched 2.5-fold uniaxially in the MD in an aqueous boric acid solution and having a temperature of 40° C. to manufacture a polarizer (thickness: 13 μm, light transmittance: 44%).

(3) A PET film (TA053, DNP Co., Ltd.) was laminated on an upper surface of the manufactured polarizer with an adhesive, and a cyclic olefin polymer (COP) film was laminated on a lower surface of the manufactured polarizer with an adhesive. An upper surface of the PET film was coated with the prepared composition for an optical functional layer to have a thickness of 10 μm using a coating bar, and underwent UV curing by radiating light in a light amount of 1,000 m $J/cm^2$ using a metal halide lamp to form an optical functional layer (refractive index of a matrix: 1.48).

An upper surface of the optical functional layer was coated with a composition for a low-reflection layer (containing a fluorine-based compound) to have a predetermined thickness and cured to form a low-reflection layer so as to manufacture a polarizing plate in which a low-reflection layer, an optical functional layer, a protective layer (PET film), a polarizer, and a protective layer (COP film) were sequentially laminated.

Example 2

A composition for an optical functional layer and a polarizer were manufactured in the same manner as in Example 1.

A lower surface of a PET film (DNP Co., Ltd., DSG-17 (Z)PET80, 8,000 nm of in-plane retardation at a wavelength of 550 nm, with a low-reflection layer on an upper surface) was coated with the prepared composition for an optical functional layer to have a thickness of 10 μm using a coating bar, and underwent UV curing by radiating light in a light amount of 1,000 m $J/cm^2$ using a metal halide lamp to form an optical functional layer.

An upper surface of the manufactured polarizer was coated with a (meth)acrylic-based adhesive and then dried at 90° C. for four minutes to form an adhesive/bonding layer, and a laminate of the manufactured optical functional layer and the PET film was laminated on an upper surface of the adhesive/bonding layer. A cyclic olefin polymer (COP) film was laminated on a lower surface of the polarizer with an adhesive to manufacture a polarizing plate in which a protective layer (including PET film and low-reflection layer), an optical functional layer, a polarizer, and a protective layer (COP film) were sequentially laminated.

Example 3

A surface-modified $CaCO_3$ particle mixture was prepared in the same manner as in Example 1.

A composition containing a resin (4550P, Shina TNC Co., Ltd.) was added to the $CaCO_3$ particle mixture, which were mixed for four hours using a stirrer, and PS(polystyrene)- based particles (SX130H, Soken Co., Ltd., spherical isotropic particles, average particle diameter D50: 1.3 μm, refractive index: 1.59) were added and mixed to prepare a composition for an optical functional layer. Based on solid content, the composition for an optical functional layer contained 6 wt % $CaCO_3$ acicular anisotropic particles and 0.6 wt % PS isotropic particles.

A polarizing plate was manufactured in the same manner as in Example 1 using the prepared composition for an optical functional layer.

Example 4

A composition for an optical functional layer and a polarizer were manufactured in the same manner as in Example 3.

A lower surface of a PET film (DNP Co., Ltd., DSG-17 (Z)PET80, 8,000 nm of in-plane retardation at a wavelength of 550 nm, with a low-reflection layer on an upper surface) was coated with the prepared composition for an optical functional layer to have a thickness of 10 μm using a coating bar, and underwent UV curing by radiating light in a light amount of 1,000 m $J/cm^2$ using a metal halide lamp to form an optical functional layer.

An upper surface of the manufactured polarizer was coated with a (meth)acrylic-based adhesive and then dried at 90° C. for four minutes to form an adhesive/bonding layer, and a laminate of the manufactured optical functional layer and the PET film was laminated on an upper surface of the adhesive/bonding layer. A cyclic olefin polymer (COP) film was laminated on a lower surface of the polarizer with an adhesive to manufacture a polarizing plate in which a protective layer (including PET film and low-reflection layer), an optical functional layer, a polarizer, and a protective layer (COP film) were sequentially laminated.

Comparative Example 1

PMMA particles (MX-300, Soken Co., Ltd., spherical isotropic particles, average particle diameter D50: 3 μm, refractive index: 1.49) were added to a composition containing a resin (4550P, Shina TNC Co., Ltd.), which were mixed to prepare a composition for an optical functional layer. Based on solid content, the composition for an optical functional layer contained 4 wt % PMMA isotropic particles. Thereafter, a polarizing plate was manufactured in the same manner as in Example 1.

Comparative Example 2

A polarizing plate was manufactured in the same manner as in Comparative Example 1, except that the content of the PMMA isotropic particles in Comparative Example 1 was changed to 8 wt %.

Comparative Example 3

PS particles (SX130H, Soken Co., Ltd., spherical isotropic particles, average particle diameter D50: 1.3 μm, refractive index: 1.59) were added to a composition containing a resin (4550P, Shina TNC Co., Ltd.), which were mixed to prepare a composition for an optical functional layer. Based on solid content, the composition for an optical functional layer contained 4 wt % PS isotropic particles. Thereafter, a polarizing plate was manufactured in the same manner as in Example 1.

Comparative Example 4

A polarizing plate was manufactured in the same manner as in Comparative Example 3, except that the content of the PS isotropic particles in Comparative Example 3 was changed to 8 wt %.

Comparative Examples 5 to 7

Polarizing plates were manufactured in the same manner as in Example 1, except that an orientation angle and a standard deviation were changed by changing the viscosity of the composition for an optical functional layer in Example 1.

Reference Example 1

A polarizer was manufactured in the same manner as in Example 1, and a polarizing plate in which a PET film, a polarizer, and a COP film were sequentially laminated on an upper surface of the manufactured polarizer was manufactured.

In Table 1 below, "-" means that the corresponding component is not contained.

A model for measuring a viewing angle below was manufactured for the polarizing plates manufactured in the Examples and Comparative Examples, and physical properties shown in Table 1 below were evaluated.

A viewer-side polarizing plate was removed from liquid crystal panel model UN55KS8000F (55 inches, Samsung Electronics TV), and each of the polarizing plates manufactured in the Examples and Comparative Examples was laminated as the viewer-side polarizing plate to manufacture a model for measuring a viewing angle. In a light source-side polarizing plate of the model for measuring the viewing angle, a COP film, a polarizer, and a PET film were sequentially laminated from the liquid crystal panel.

The following physical properties were evaluated, and results of the evaluation are shown in Table 1 below.

(1) Average value (units: °) and standard deviation (units: °) of orientation angles: An optical microscope (Olympus MX61 L, 500× magnification (10×50)) was focused on surfaces of the optical functional layers manufactured in the Examples and Comparative Examples, a height thereof was adjusted, an image was stored, and an average value and standard deviation of orientation angles were obtained by executing a FIJI program (Method: Fourier Components, N bis: 90°, Histogram start: 0°, Histogram end: 180° input).

(2) Front relative brightness (units: %): A light-emitting diode (LED) light source, a light guide plate, and the model for measuring the viewing angle were assembled to manufacture a liquid crystal display device (same configuration as Samsung TV (55 inches, model name: UN55KS8000F)

except for the configuration of the liquid crystal display module of the Examples and Comparative Examples) including a one-sided edge-type LED light source. Brightness was measured in each of a black mode and white mode from a front surface (0°, 0°) using a spherical coordinate system using EZCONTRAST X88RC (EZXL-176R-F422A4, ELDIM Co., Ltd.). Relative brightness was calculated by {(front brightness of each of Examples, Comparative Examples, and Reference Example 1)/(front brightness of Reference Example 1)}×100. The higher the relative brightness in the white mode, the lower the relative brightness in the black mode.

(3) Relative contrast ratio (units: %) at front surface and side surface: A liquid crystal display device was manufactured in the same manner as in (2). A contrast ratio was measured at a front surface (0°, 00) and side surfaces (0°, 30°) and (0°, 60°) using a spherical coordinate system using EZCONTRAST X88RC (EZXL-176R-F422A4, ELDIM Co., Ltd.). The contrast ratio was calculated as a ratio of the brightness in the white mode to the brightness in the black mode. The relative contrast ratio was calculated by {(contrast ratio of each of Examples, Comparative Examples, and Reference Example 1)/(contrast ratio of Reference Example 1)}×100.

(4) Relative brightness ratio (units: %) of the side surface to the front surface in the white mode: A liquid crystal display device was manufactured in the same manner as in (2). The brightness in the white mode was measured at a front surface (0°, 0°) and side surfaces (0°, 30°) and (0°, 60°) using a spherical coordinate system using EZCONTRAST X88RC (EZXL-176R-F422A4, ELDIM Co., Ltd.). The relative brightness ratio was calculated by {(side brightness of each of Examples, Comparative Examples, and Reference Example 1)/(front brightness of each of Examples, Comparative Examples, and Reference Example 1)}×100.

(5) Internal haze (units: %): An internal haze having a structure of a low-reflection layer, an optical functional layer, a protective layer (PET film) or a low-reflection layer, a protective layer (PET film), and an optical functional layer was measured using a haze measurement device NDH-2000 (NIPPON DENSHOKU Co., Ltd.). The internal haze is a value measured with NDH-2000 using a specimen manufactured by dropping ethanol on glass with a total haze value of 1% or less and then completely bringing it into contact with a low-reflection layer from among a low-reflection layer, an optical functional layer, and a protective layer (PET film).

(6) Total light transmittance (units: %): A total light transmittance having a structure of a low-reflection layer, an optical functional layer, a protective layer (PET film) or a low-reflection layer, a protective layer (PET film), and an optical functional layer was measured using a spectrophotometer as a total light transmittance measurement device.

TABLE 1

| | Examples | | | | Comparative Examples | | | | | | | Reference Examples |
| --- | --- | --- | --- | --- | --- | --- | --- | --- | --- | --- | --- | --- |
| | 1 | 2 | 3 | 4 | 1 | 2 | 3 | 4 | 5 | 6 | 7 | 1 |
| Content of acicular particles | 6 | 6 | 6 | 6 | — | — | — | — | 6 | 6 | 6 | — |
| Content of isotropic particles | 0.6 | 0.6 | 0.6 | 0.6 | 4 | 8 | 4 | 8 | 0.6 | 0.6 | 0.6 | — |
| Average value of orientation angles | +1 | +2 | +1 | +1 | — | — | — | — | +12 | +29 | +36 | — |
| Standard | 12 | 13 | 12 | 12 | — | — | — | — | 13 | 12 | 22 | — |

TABLE 1-continued

| | | Examples | | | | Comparative Examples | | | | | | | Reference Examples |
|---|---|---|---|---|---|---|---|---|---|---|---|---|---|
| | | 1 | 2 | 3 | 4 | 1 | 2 | 3 | 4 | 5 | 6 | 7 | 1 |
| deviation of orientation angles | | | | | | | | | | | | | |
| Front surface brightness | White mode | 95 | 94 | 93 | 93 | 102 | 103 | 94 | 91 | 96 | 96 | 92 | 100 |
| | Black mode | 133 | 132 | 136 | 135 | 127 | 152 | 217 | 240 | 140 | 139 | 156 | 100 |
| Contrast ratio | Front surface | 71 | 71 | 68 | 69 | 80 | 68 | 43 | 38 | 69 | 69 | 59 | 100 |
| | 30 degrees | 103 | 102 | 98 | 99 | 95 | 93 | 84 | 79 | 96 | 95 | 94 | 100 |
| | 60 degrees | 111 | 113 | 112 | 113 | 97 | 97 | 93 | 90 | 95 | 94 | 93 | 100 |
| Relative luminance ratio of side surface to front surface | 30 degrees | 53.8 | 53.2 | 54.1 | 54.0 | 42.8 | 42.8 | 45.9 | 47.4 | 52.1 | 51.3 | 49.8 | 49.8 |
| | 60 degrees | 19.5 | 19.7 | 20.0 | 20.1 | 15.5 | 15.3 | 16.0 | 16.3 | 19.2 | 18.9 | 18.3 | 17.9 |
| Internal haze | | 28.3 | 28.1 | 32.8 | 32.5 | 3.5 | 7.9 | 46.8 | 67.8 | 28.5 | 28.8 | 30.1 | 1.0 |
| Total light transmittance | | 97.1 | 97.2 | 97.2 | 97.1 | 95.7 | 95.6 | 98.1 | 99.5 | 97.1 | 97.1 | 97.0 | 97.3 |

As shown in Table 1, although the polarizing plate of the present invention does not have a pattern, the polarizing plate of the present invention achieves an effect of improving visibility by improving the contrast ratio, achieves an effect of uniform screen quality between the front surface and the side surface by increasing the relative luminance ratio of the side surface to the front surface, and concurrently, or simultaneously, achieves improvement in visibility and control of haze with a single layer.

On the other hand, Comparative Examples 1 to 4, in which the acicular particles are not contained and only the isotropic particles are contained, and Comparative Examples 5 to 7, in which the average value and standard deviation of the orientation angles of the present invention are not satisfied even when the acicular particles are contained, failed to achieve all of the above-described effects of the present invention.

Although some example embodiments have been described herein, modifications and alterations of embodiments of the present invention may be performed by those skilled in the art. It is to be understood that such modifications and alterations are included in the scope of the present invention.

What is claimed is:

1. A polarizing plate comprising:
a polarizer; and
an optical functional layer on a light emission surface of the polarizer,
wherein the optical functional layer comprises a mixture of anisotropic particles and isotropic particles,
the anisotropic particles comprise acicular particles, and
the acicular particles are oriented in an in-plane direction of the optical functional layer, and when a light absorption axis of the polarizer is 0°, an average value of orientation angles formed between the light absorption axis of the polarizer and a longitudinal direction of the acicular particles is in a range from −10° to +10°, and a standard deviation of the orientation angles is 15° or less.

2. The polarizing plate as claimed in claim 1, wherein the optical functional layer comprises an anti-glare layer, a hard coating layer, a low-reflection layer, an anti-reflection layer, a low refractive index layer, a high refractive index layer, or an anti-fingerprint layer.

3. The polarizing plate as claimed in claim 1, wherein the optical functional layer comprises a contrast ratio or brightness improvement layer.

4. The polarizing plate as claimed in claim 1, wherein the optical functional layer is non-adhesive.

5. The polarizing plate as claimed in claim 1, wherein the optical functional layer is adhesive.

6. The polarizing plate as claimed in claim 1, wherein the acicular particles are particles comprising one or more of titanium oxide, zirconium oxide, zinc oxide, calcium carbonate, boehmite, aluminum borate, calcium silicate, magnesium sulfate, magnesium sulfate hydrate, and potassium titanate.

7. The polarizing plate as claimed in claim 1, wherein the acicular particles are contained in the optical functional layer in an amount of 0.1 to 10 wt %.

8. The polarizing plate as claimed in claim 1, wherein the isotropic particles are randomly mixed in the optical functional layer.

9. The polarizing plate as claimed in claim 1, wherein the isotropic particles comprise one or more types of inorganic particles, organic particles, and organic-inorganic particles.

10. The polarizing plate as claimed in claim 1, wherein the isotropic particles have an average particle diameter (D50) of 6 μm or less.

11. The polarizing plate as claimed in claim 1, wherein the isotropic particles comprise one or more types of polyacrylate-based particles, polymethacrylate-based particles, polystyrene-based particles, silicone-based particles, polycarbonate-based particles, polyolefin-based particles, polyester-based particles, polyamide-based particles, polyimide-based particles, polyfluoroethylene-based particles, polymethyl methacrylate-polyacrylate-based particles, polyacrylate-polystyrene-based particles, and melamine-based particles.

12. The polarizing plate as claimed in claim 1, wherein the isotropic particles are contained in a smaller amount than the acicular particles.

13. The polarizing plate as claimed in claim 12, wherein the isotropic particles are contained in an amount of 1 to 80 parts by weight with respect to 100 parts by weight of the acicular particles.

14. The polarizing plate as claimed in claim 1, wherein the isotropic particles are contained in the optical functional layer in an amount of 0.05 wt % to 2 wt %.

15. The polarizing plate as claimed in claim 1, wherein the optical functional layer comprises a matrix into which the anisotropic particles and the isotropic particles are impregnated.

16. The polarizing plate as claimed in claim 15, wherein the acicular particles and the isotropic particles each have a higher refractive index than the matrix.

17. The polarizing plate as claimed in claim 1, wherein the optical functional layer has overall planar upper and lower surfaces.

18. The polarizing plate as claimed in claim 1, further comprising one or more of a protective layer, an adhesive layer, a bonding layer, a functional film, and a functional coating layer.

19. The polarizing plate as claimed in claim 18, wherein a laminate of the optical functional layer and the protective layer has an internal haze of 10% to 60%.

20. An optical display apparatus comprising the polarizing plate as claimed in claim 1.

\* \* \* \* \*